J. O. BERG.
TOOL FOR TREATING STONE, CONCRETE, AND OTHER MATERIALS.
APPLICATION FILED MAR. 13, 1915. RENEWED JUNE 3, 1916.

1,223,359.

Patented Apr. 24, 1917.
2 SHEETS—SHEET 1.

WITNESSES
Geo. M. Naylor
E. B. Marshall

INVENTOR
John O. Berg
BY Munn & Co
ATTORNEYS

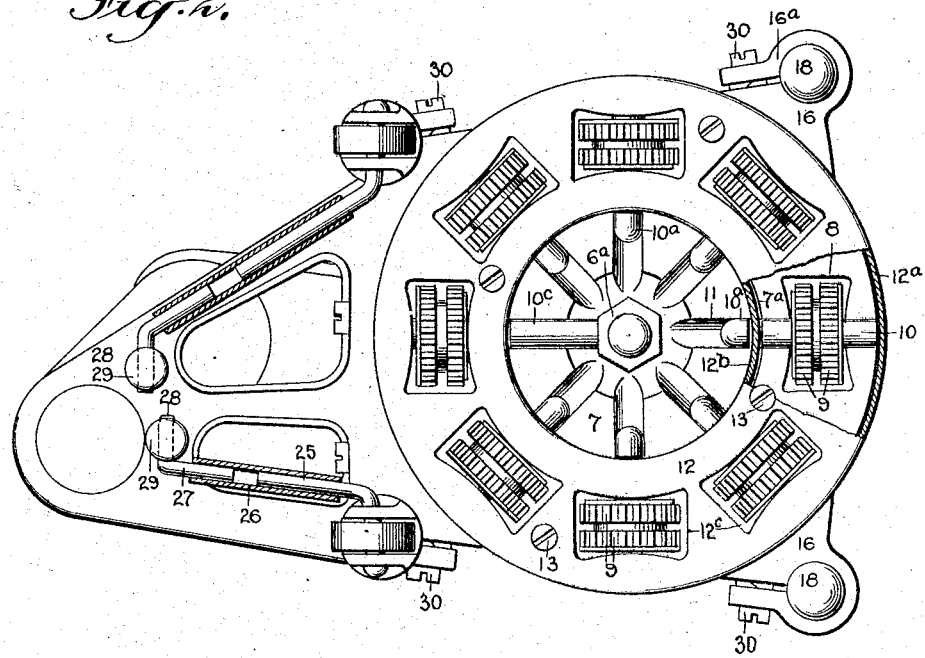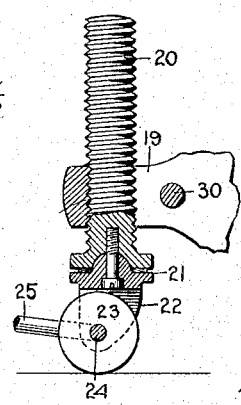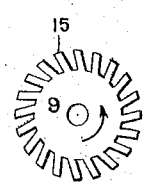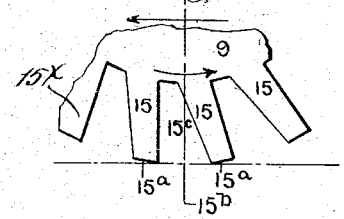

UNITED STATES PATENT OFFICE.

JOHN O. BERG, OF NEW YORK, N. Y., ASSIGNOR TO ROTARY POWER-TOOL COMPANY, INC., OF NEW YORK, N. Y., A CORPORATION OF NEW YORK.

TOOL FOR TREATING STONE, CONCRETE, AND OTHER MATERIALS.

1,223,359.

Specification of Letters Patent.

Patented Apr. 24, 1917.

Application filed March 13, 1915, Serial No. 14,101. Renewed June 3, 1916. Serial No. 101,645.

*To all whom it may concern:*

Be it known that I, JOHN O. BERG, a citizen of the United States, and a resident of the city of New York, borough of Manhattan, in the county and State of New York, have invented a new and useful Tool for Treating Stone, Concrete, and other Materials, of which the following is a full, clear, and exact description.

This invention relates to tools for surfacing stone, concrete and other similar materials, and is herein shown as embodied in a power-operated rotary surfacer. It will be understood, however, that the invention is not restricted to the embodiment and uses herein described and illustrated, and that many features of the invention are of general applicability in the art to which it relates.

An object of the invention is to provide a surfacing tool for the purposes herein set forth which will produce a better finished surface upon concrete, artificial stone, etc., than has been obtainable with the methods and tools heretofore employed and which will have capacity for a greater amount of finished work in a given time. More particularly the invention aims to provide a surfacing tool which will effect the resurfacing operation by a chiseling or chipping action as distinguished from a grinding action.

Another object of the invention is to provide a tool for the purposes herein set forth which can be operated successfully by comparatively unskilled labor and which will require little attention from the operator, either to keep its cutting parts sharp or to keep the tool as a whole in proper operative condition.

An important feature of the invention is the novel cutter employed to secure the chiseling or chipping action hereinabove referred to, this cutter being so constructed and arranged and so operated that its cutting edges are maintained in proper cutting condition by the action of the work upon the cutter in the cutting operation. Another important feature of the invention is the provision of parts coöperating with the cutter both to define the field of its operation and by action upon the surface to be treated to facilitate such operation.

Other important features of the invention are the novel means for supporting and guiding the cutters, the novel means for driving the cutter carrier, and the novel means for securing proper lubrication of the driving elements and the protection of these elements from dirt, grit, and other foreign substances. Still other objects and important features of the invention will appear from the following description and claims when considered in connection with the accompanying drawings, in which—

Fig. 2 is an inverted plan view of Fig. 1, parts being broken away to illustrate the construction partially in section;

Fig. 4 is a fragmentary sectional view showing how the rollers are mounted;

Fig. 5 is a view showing one of the disks, and

Fig. 6 is an enlarged fragmentary view illustrating the shape of the teeth on the disks.

Figure 1:
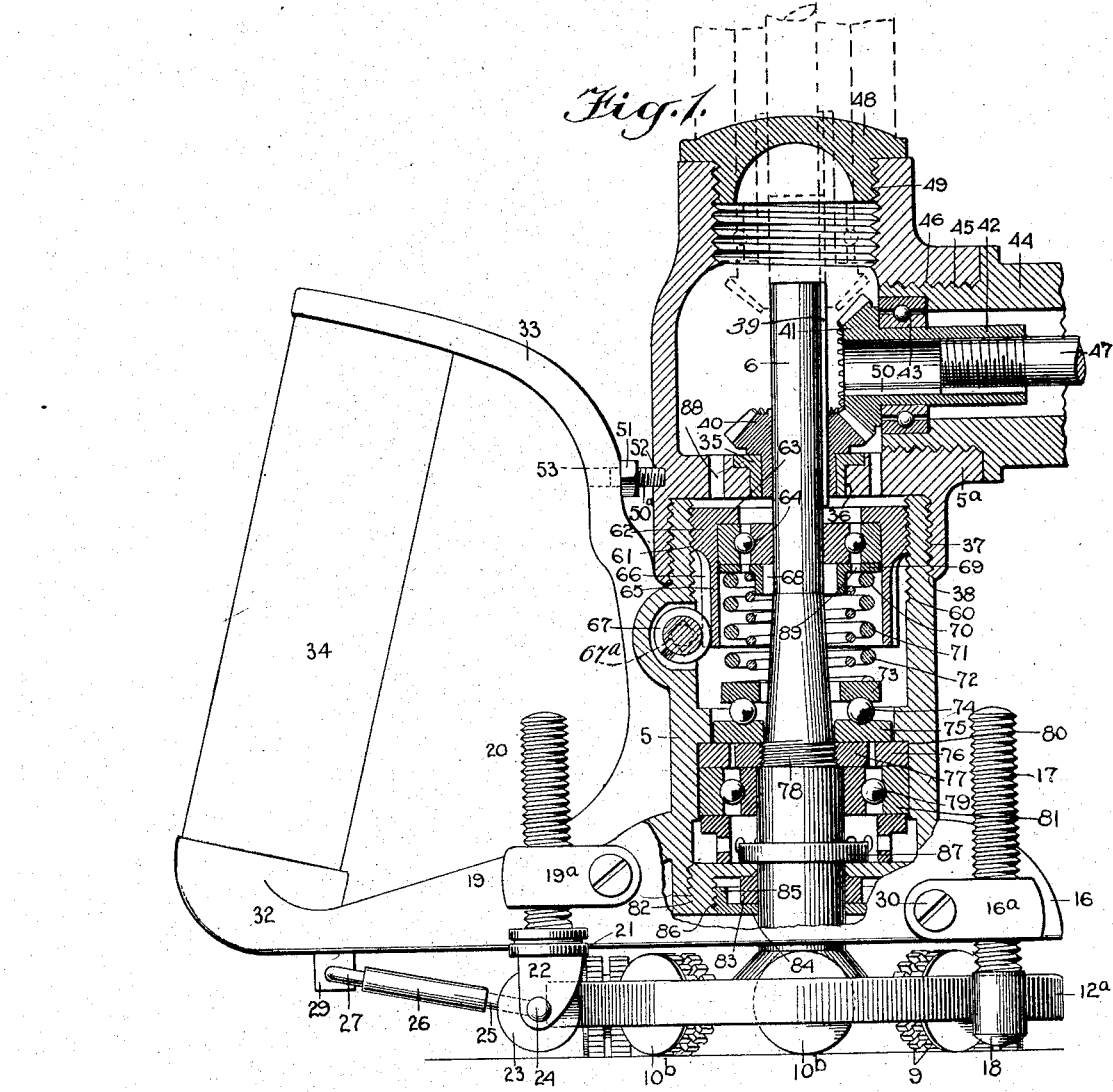
Figure 1 is a sectional side elevation of the invention.
Figure 3:
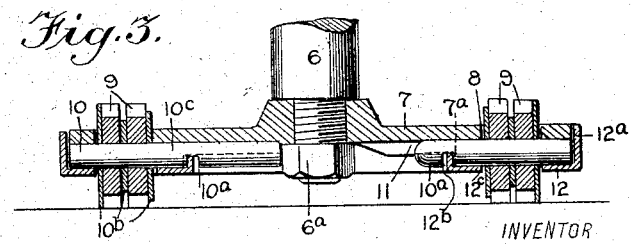
Fig. 3 is a sectional view of the plate and showing how the spindles and disks are mounted relatively thereto.

By referring to the drawings it will be seen that a casing 5 is provided having a shaft 6 rotatably and slidably mounted therein, and to which is secured a plate 7 constituting a part of the cutter carrier now to be described. In this plate 7 there are openings 8 for receiving the disks or rotary cutters 9, these disks or cutters 9 being mounted on the spindles 10, which are disposed in the bearing grooves 11 in the plate 7, the spindles 10 being held in the said grooves by the plate 12 which is secured against the plate 7 by the screws 13. The plate 12 has an outer flange 12$^a$ which engages the periphery of the plate 7 and an inner flange 12$^b$ which is disposed at the shoulder 7$^a$ in the plate 7 and also in the recesses 10$^a$ in the spindles 10, the rotation of the spindles 10 being prevented by this means. The plate 12 also is provided with openings 12$^c$ through which the disks or cutters 9 are disposed. The plate 7 is held on the shaft 6 by a nut 6$^a$ and the spindle 10$^c$ is enlarged to engage the nut 6$^a$ and prevent its rotation relatively to the plate 7. The disks or cutters 9 have teeth 15 projecting from their peripheries, these teeth 15 being disposed at angles to the radii of the disks or cutters 9 so that when said disks or cutters rotate against the surface of the stone to be treated with the rotation of the plate 7, the teeth 15 will strike the said surface of the stone with great rapidity to treat the stone as desired. It is understood that the teeth 15 may be disposed at any desired angle relatively to the radii of the disks or cutters 9 and that they may be of any desired size and may be spaced apart as may be best to accomplish the results desired with the particular stone which is being treated.

Mounted on the spindles 10 at the sides of and between the disks or cutters 9 there are washers 10$^b$, the washers 10$^b$ at the outer sides of the cutters 9 being of substantially the same diameter as the cutters, these washers 10$^b$ holding the cutters in position relatively to each other and serving to limit the action of the teeth 15.

The casing 5 has ears 16 with threaded orifices in which mesh screws 17 having heads 18 for engaging the surface of the stone which is being treated to position the teeth 15 on the disks or cutters 9 as may be desired relatively to the said surface. The casing 5 also has additional ears 19 in which mesh screws 20 having brackets 21 journaled at their lower ends, these brackets having flanges 22 between which are disposed rollers 23, these rollers 23 being mounted on the bent terminals 24 of the rods 25, the terminals 24 being journaled in bearings in the flanges 22. The rods 25 are movably disposed in the sleeves 26, rods 27 also being disposed in the said sleeves 26, these rods 27 having bent terminals 28 articulated to the studs 29. The rollers 23 as well as the heads 18 serve to gage the position of the teeth 15 of the disks or cutters 9 with respect to the surface of the stone which is being treated. The rollers 23 are permitted to rotate under the guidance of the operator. The brackets 21 are journaled on vertical axes to turn relatively to the screws 20, as has been described, so that the rollers may at all times be held parallel with each other when the screws 20 are rotated for adjustment. The screws 17 and the screws 20 are held in adjusted position by the locking screws 30 which bind the said screws 17 and 20 between the ears 16 and 19 and the straps 16$^a$ and 19$^a$ connected therewith.

The studs 29 are secured to the arm 32, there being a second arm 33 which extends from the casing 5 above the arm 32, these arms 32 and 33 being joined by the handle 34.

The shaft 6 is slidably mounted in the gear 40 which is journaled in a bearing 35 which rests in an opening 36 in a member 5$^a$ of the casing 5, the casing member 5$^a$ having an inner thread 37 which meshes with an outer thread 38 on the casing 5. The shaft 6 above the bearing 35 is provided with a key 39 which secures it for rotating with the gear wheel 40 mounted on the shaft 6. This gear wheel 40 normally meshes with a gear wheel 41 integral with a hollow shaft 42 journaled in bearings 43 in a plug 44. This plug has an outer thread 45 which normally meshes with the thread opening 46 in the casing member 5$^a$. The hollow shaft 42 is rotated by a shaft 47 which screws into the said hollow shaft. With this arrangement the shaft 6 is rotated by a shaft which is disposed at right angles to it.

When it is desired to rotate the shaft 6 by a shaft disposed coaxially therewith the plug 48 is unscrewed and the plug 44 is screwed into the threaded orifice 49, the hollow shaft 42 having a groove 50 to receive the key 39 so that the shaft 6 will rotate with the shaft 47. The plug 48 is then screwed into the threaded opening 46.

In the casing 5 there is an inner thread 60 in which meshes the outer thread 61 on the bearing 62. This bearing 62 has a shoulder 63 against which is disposed the ball bearing 64 which serves to hold the shaft in position. The bearing 62 has a sleeve 65 with outer teeth 66 with which meshes the worm 67 journaled in bearings in the casing 5. The angular end 67$^a$ of the worm shaft projects beyond the casing, so that it may be engaged by the wrench to turn the worm and with it the bearing 62. Against the ball bearing 64 there is disposed a collar 68, the collar having a flange 69 against which abuts the inner end 70 of the spring 71, being disposed between the collar 68 and the sleeve 65. The outer end 72 of the spring 71 presses against the end 73 of the ball bearing 74, the other end 75 of the ball bearing 74 pressing against the stop 76, the collar 77 having an inner thread meshing with the thread 78 on the shaft 6. Another ball bearing 79 is disposed beyond the collar 77 and the stop 76, the ball bearing 79 pressing the stop 76 against the shoulder 80 in the casing 5 and being held in position by the collar 81 which is engaged by the plug 82 which closes the outer end of the casing around the shaft 6. A bearing 83 of the shaft 6 is held in position by a collar 84 disposed around the shaft 6 and having a thread 85 meshing with a thread 86 in the plug 82.

The stop 76 limits the outward movement of the ball bearing 74; the collar 77 which is secured to the shaft 6 serving to push the said ball bearing 74 inward against the influence of the spring 71 when the tool is in use. The collar 87 is provided to prevent foreign substances from entering the casing 5 and also serves as a stop to limit the outward movement of the shaft 6.

A lubricant is supplied to the casing member 5$^a$ and this lubricant is fed through the opening 88 to the casing 5; the lubricant then flows around the ball bearing 64 through the opening 89 in the flange 69 to the ball bearing 74. The lubricant then flows between the collar 77 and the stop 76 to the ball bearing 79, and when the shaft 6 is moved inwardly the collar 87 is raised to permit the lubricant to flow to the bearing 83, and on the return movement of the shaft 6 lubricant is forced through the bearing 83 to keep the said bearing clean.

In using the device the operator grasps the handle 34 and when the shaft 6 is rotated and the plate 7 rotates therewith, the operator brings the teeth 15 against the surface of the stone which is to be treated, and with the rotation of the plate 7 with the shaft 6, which is yieldingly extended, the teeth 15 will strike the surface of the stone repeatedly to treat the stone in the manner desired. Any desired number of spindles and disks may be employed.

When the casing member 5ª is turned home the nut 51 is turned to move the terminal of the screw 50ª into the orifice 52 in the casing member 5ª, the screw being also disposed in the orifice 53 in the arm 33.

As will be seen by referring to Fig. 6, the ends 15ª of the teeth 15 are preferably spaced equal distances from a radius 15ᵇ which is parallel to the neighboring side 15ᶜ of one of the adjacent teeth.

The teeth are constructed in this manner as it has been found that they give the longest and most efficient service.

The direction of the bodily movement of the rotary cutters over the surface to be treated is indicated by the arrow above the cutter in Fig. 6 of the drawings, and the direction of rotation of the cutters as they are rolled over the surface, is indicated by the arrows upon the cutters in Figs. 5 and 6. The tooth which is next to strike the surface to be treated is shown at 15ˣ in Fig. 6, and it will be noted that the point of this tooth, which first engages the surface, is formed by the intersection of the side 15ᶜ with the end 15ª.

In order to prevent the action of the cutters as they are rolled over the surface to be treated from partaking too much of the nature of the rolling of a polygonal body, the washers 10ᵇ are provided, these washers also coöperating in the cutting and surfacing operations of the tool. The washers 10ᵇ, by cutting grooves in the surface to be treated adjacent to which the chiseling or chipping action of the teeth of the cutters takes place, facilitate this chiseling or chipping action and the removal of the material produced by such action.

It will be noted that washers 10ᵇ which are substantially flush with the peripheries of the cutters, are located outside the outermost series of cutters, whereby they not only guide and coöperate with the cutters in the cutting operation, but are so located that they remove inequalities in the work of the tool as the tool is moved over the surface to be treated, these washers being the last parts of the cutting elements of the tool to pass over the surface.

Having thus described my invention, I claim as new and desire to secure by Letters Patent:

1. In a tool of the class described, a rotary toothed cutter supported to be rotated by rolling engagement with the surface to be treated, said cutter having the cutting edge of each tooth leading in the direction of rotation of said cutter and having the leading face of each tooth receding, with respect to said direction of rotation, from the radius to the cutting edge, and means for rolling said cutter bodily over the surface to the treated.

2. In a tool of the class described, a rotary toothed cutter supported to be rotated by rolling engagement with the surface to be treated, said cutter having the cutting edge of each tooth leading in the direction of rotation of said cutter and having the leading face of each tooth receding, with respect to said direction of rotation, from the radius to the cutting edge, means for rolling said cutter bodily over the surface to be treated, and means for yieldingly holding said cutter in engagement with the surface to be treated.

3. In a tool of the class described, a rotary toothed cutter supported for rotation by rolling engagement with the surface to be treated, said cutter having the body of each tooth receding, with respect to the direction of rotation of the cutter, from the radius to the cutting edge, and a carrier automatically rolling said cutter bodily in a closed path while maintaining the axis of the cutter in one plane.

4. In a tool of the class described, a rotary toothed cutter supported for rotation by rolling engagement with the surface to be treated, said cutter having the body of each tooth receding, with respect to the direction of rotation of the cutter, from the radius to the cutting edge, a carrier automatically rolling said cutter bodily in a closed path while maintaining the axis of the cutter in one plane, and a resilient mount for said carrier pressing said carrier outward transversely to said plane.

5. In a tool of the class described, a rotary toothed cutter supported for rotation by rolling engagement with the surface to be treated, said cutter having the body of each tooth receding, with respect to the direction of rotation of the cutter, from the radius to the cutting edge, means for constantly pressing said cutter into engagement with the surface to be treated, and means for repeatedly rolling said cutter bodily over said surface in the direction to effect the aforementioned rotation of said cutter.

6. In a tool of the class described, a rotary toothed cutter supported to be rotated by rolling engagement with the surface to be treated, said cutter having the cutting edge of each tooth leading in the direction of rotation of said cutter and having the leading face of each tooth receding, with respect to said direction of rotation, from the radius to the cutting edge, and means for repeatedly rolling said cutter bodily over the surface to be treated in the direction to effect the aforementioned rotation of said cutter.

7. In a tool of the class described, a series of rotary toothed cutters supported to be rotated by rolling engagement with the surface to be treated, and each having the cutting edges of its teeth leading in the direction of rotation of the cutter and having the leading face of each tooth receding, with respect to said direction of rotation, from the radius to the cutting edge, and means for repeatedly rolling said cutters bodily in succession over the surface to be treated in the direction to effect the aforementioned rotation of said cutter.

8. In a tool of the class described, a rotary toothed cutter supported to be rotated by rolling engagement with the surface to be treated, said cutter having the cutting edge of each tooth leading in the direction of rotation of said cutter and having the leading face of each tooth receding, with respect to said direction of rotation, from the radius to the cutting edge, means for rolling said cutter bodily over the surface to be treated in order to roll said teeth successively into chiseling or chipping engagement with said surface, and means adjacent to and movable with said cutter and having a cutting periphery substantially flush with the periphery of said cutter for defining the area of the chiseling or chipping action of said cutter.

9. In a tool of the class described, a rotary toothed cutter supported to be rotated by rolling engagement with the surface to be treated, said cutter having the cutting edge of each tooth leading in the direction of rotation of said cutter and having the leading face of each tooth receding, with respect to said direction of rotation, from the radius to the cutting edge, means for rolling said cutter bodily over the surface to be treated, and a rotary disk adjacent to and movable with said cutter, and having a cutting periphery substantially flush with the periphery of said cutter.

10. In a tool of the class described, a series of rotary toothed cutters supported to be rotated by rolling engagement with the surface to be treated, and each having the cutting edges of its teeth leading in the direction of rotation of the cutter and having the leading face of each tooth receding, with respect to said direction of rotation, from the radius to the cutting edge, and a carrier for rolling said cutters bodily in succession over the surface to be treated, said carrier being constructed to maintain the axes of said cutters substantially in one plane.

11. In a tool of the class described, a series of rotary toothed cutters supported to be rotated by rolling engagement with the surface to be treated, and each having the cutting edges of its teeth leading in the direction of rotation of the cutter and having the leading face of each tooth receding, with respect to said direction of rotation, from the radius to the cutting edge, and a carrier in which said cutters are mounted with their axes radially arranged substantially in one plane about a common center, said carrier being rotatable about said center to roll said cutters bodily in succession over the surface to be treated.

12. In a tool of the class described, a series of rotary toothed cutters supported to be rotated by rolling engagement with the surface to be treated, and each having the cutting edges of its teeth leading in the direction of rotation of the cutter and having the leading face of each tooth receding, with respect to said direction of rotation, from the radius to the cutting edge, a carrier in which said cutters are mounted with their axes radially arranged substantially in one plane about a common center, said carrier being rotatable about said center to roll said cutters bodily in succession over the surface to be treated, a support for said carrier having surface-engaging stops, means for yieldingly pressing said carrier outward in its support, and means for limiting the outward movement of said carrier with respect to said stops.

13. In a tool of the class described, a rotatably mounted plate having a bearing disposed substantially radially and a rotary toothed cutter journaled in said bearing, said cutter having its teeth each provided with an end face substantially normal to the radius of the cutter and with a leading face disposed at an acute angle to said end face, and a rotary disk adjacent to and movable with said cutter and having a cutting periphery substantially flush with the periphery of said cutter.

14. In a tool of the class described, a rotatably mounted plate having a bearing disposed substantially radially and a rotary toothed cutter journaled in said bearing, said cutter having its teeth each provided with an end face substantially normal to the radius of the cutter and with a leading face disposed at an acute angle to said end face, a rotary disk adjacent to and movable with said cutter and having a cutting periphery substantially flush with the periphery of said cutter, and a resilient mount for said plate pressing said plate outward transversely to its plane of rotation.

15. In a tool of the class described, a rotatably mounted plate having a radial bearing, a spindle mounted in the bearing, a disk mounted on the spindle and having teeth extending from its periphery at an angle to the radius of the disk, and a washer mounted on the spindle and extending substantially to the outer ends of the teeth on the disk for limiting the depth of the cut made by the teeth and for removing inequalities in the cut of the teeth.

16. In a tool of the class described, a casing having an inner thread, a bearing having a shoulder and an outer thread meshing with the inner thread, a bearing disposed against the shoulder, a shaft journaled in the last mentioned bearing, a worm journaled in the casing, teeth on the first bearing with which the worm meshes, another bearing in which the shaft is journaled, a collar secured to the shaft with which the last mentioned bearing engages, and resilient means for holding the second and third bearings yieldingly away from each other.

17. In a tool of the class described, a casing, a bearing in the casing, means to limit the movement of the bearing in one direction, relatively to the casing, a shaft journaled in the bearing, a collar secured to the shaft and disposed within and spaced from the means to provide a lubricant opening, the collar being normally disposed against the bearing, another collar for holding the bearing against movement in the other direction, a plug for closing the end of the casing and having an opening through which the shaft is disposed, the plug being disposed against the last collar, a collar on the shaft and normally disposed against the inner side of the plug.

18. In a tool of the class described, a plate having an opening and a bearing groove leading thereto, a spindle disposed in the groove, a surface treating member mounted on the spindle, there being a recess in the spindle and a second plate having an opening, through which the surface treating member extends, the second mentioned plate being provided with a flange engaging the spindle at its recess.

19. In a tool of the class described, a plate having an opening and a bearing groove leading thereto, a spindle disposed in the groove, a surface treating member mounted on the spindle, a second plate having an opening, through which the surface treating member extends, a threaded shaft on which the first plate is mounted, and a nut meshing with the thread on the shaft and engaging the plate, the spindle engaging the nut to prevent its rotation relatively to the shaft.

20. In a tool of the class described, a rotary cutter carrier, a longitudinally movable spindle on which said carrier is mounted, a shaft for driving said spindle, coöperating means on said shaft and said spindle for connecting said shaft and said spindle either for coaxial driving or for right angular driving, and interchangeable means for covering one point of connection when the other is being utilized.

In testimony whereof I have signed my name to this specification in the presence of the two subscribing witnesses.

JOHN O. BERG.

Witnesses:
EVERARD B. MARSHALL,
GEORGE H. EMSLIE.

Copies of this patent may be obtained for five cents each, by addressing the "Commissioner of Patents, Washington, D. C."

WHEREAS the patentee has returned the Letters Patent No. 1,223,359, granted on application renewal No. 101,645, and requested that a new patent be issued, on the ground that certain matter has been omitted before line 35 of page 3 and after line 47, same page, and WHEREAS it appears from the official record of the case that the patent was improperly issued, it is HEREBY ORDERED that the instrument purporting to be Patent No. 1,223,359 be, and the same is, hereby withdrawn.

It is FURTHER ORDERED that the seal be broken, the document marked *withdrawn* and returned to the file, and that a patent conforming to the correct record of the application be issued forthwith.

May 24, 1917.        R. F. WHITEHEAD,
*First Assistant Commissioner.*